United States Patent
Hirasawa et al.

(10) Patent No.: US 7,617,339 B2
(45) Date of Patent: Nov. 10, 2009

(54) SERIAL INTERFACE CIRCUIT FOR DATA TRANSFER

(75) Inventors: Masayuki Hirasawa, Tokyo (JP); Mitsuhiro Watanabe, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 684 days.

(21) Appl. No.: 11/377,617

(22) Filed: Mar. 17, 2006

(65) Prior Publication Data

US 2006/0215646 A1    Sep. 28, 2006

(30) Foreign Application Priority Data

Mar. 24, 2005 (JP) ............................ 2005-085129

(51) Int. Cl.
  G06F 3/00  (2006.01)
  G06F 13/12 (2006.01)
  G06F 1/04  (2006.01)
  G06F 1/12  (2006.01)
(52) U.S. Cl. .................. 710/61; 710/58; 710/62; 710/71; 713/375; 713/400; 713/500; 713/600
(58) Field of Classification Search .............. None
  See application file for complete search history.

(56) References Cited

U.S. PATENT DOCUMENTS 6,260,086 B1    7/2001  Butler et al.
7,243,173 B2 *  7/2007  Campbell ................ 710/71

* cited by examiner

Primary Examiner—Alan Chen
(74) Attorney, Agent, or Firm—Studebaker & Brackett PC; Donald R. Studebaker

(57) ABSTRACT

A serial interface circuit includes a first circuit disposed in the core portion and connected to the CPU, and a second circuit disposed in the peripheral circuit and connected to the peripheral registers and the first circuit; the first circuit including mirror registers, shift registers, in the write operation, serially outputting write data to the second circuit, and in the read operation, serially receiving read data supplied from the second circuit, and a first control block, in the read operation, generating a timing signal for writing the read data held in the shift registers into the corresponding mirror registers; the second circuit including shift registers and a second control block generating a second timing signal for either writing the write data held in the second shift register into the corresponding peripheral register or outputting data held in the peripheral register to the second shift register.

5 Claims, 7 Drawing Sheets ent circuit, and more particularly, to a reduction of the CPU overhead when a CPU accesses a peripheral circuit.

2. Description of the Related Art

The use of the finer semiconductor process leads to an increase of the transistor off-leak current, thereby increasing the consumption current of a large-scale integrated (LSI) circuit in a standby state, where clock and input/output operations stop, to a too high level to ignore. The reduction of the consumption current is a big issue especially for a portable device taking power from a battery. One of the most effective methods for reducing the consumption current in a standby state is to shut off power to the LSI circuit.

In a case of an LSI circuit which shuts off the entire circuit when powering off, there is no problem to use a usual shut-off procedure and a usual power-on procedure. In a case of an LSI circuit which shuts off a part of the circuit when powering off, such as an LSI circuit including an internal clock function, the LSI circuit must be divided into a backup area portion which must be always powered and a power-off area portion which can be powered off, and must have a backup mode, in which the power-off area portion is powered off and the backup area portion is not powered off in a standby state.

The LSI circuit including both the backup area portion and the power-off area portion tends to have a reduced withstand voltage due to the finer semiconductor process and cause a gate oxide film to be broken down due to a current flowing into a transistor circuit from a different power supply. Therefore, a protection device against such electrostatic breakdown and latch-ups must be provided on each signal line of the interface. As the number of the signal lines increases, an area occupied by the protection devices provided on the individual signal lines has become too large to ignore.

One solution to the above problem is to change the interface between the backup area portion and the power-off area portion from parallel to serial, suppressing an increase in the number of the signal lines and consequently reducing an area occupied by the protection devices.

FIG. 1 is a diagram showing a configuration of a part of an LSI circuit including a conventional serial interface circuit. The LSI circuit includes a power-off area portion PO including a CPU 1, as shown in the left half of FIG. 1, and a backup area portion BU including an internal clock (not shown) and other components, as shown in the right half of FIG. 1.

Referring to FIG. 1, the power-off area portion PO includes a shift register (SR) 11 for use when 32-bit data are serially transferred to/from the backup area portion BU, a shift register (SR) 12 for use when a 2-bit address specifying a register in the backup area portion BU is serially transferred, and a shift register (SR) 13 for use when a 1-bit control signal specifying a read operation or a write operation is transferred to the backup area portion BU. The power-off area portion PO also includes a first control block 14, a mode control circuit 71, and protection devices PD. The shift registers 11, 12 and 13 are connected in series and send/receive a 35-bit signal to/from the backup area portion BU serially in synchronization with a shift clock SCK sent from the first control block 14.

The shift register 11 is configured to perform parallel transfer of read data RD and write data WD to/from a system bus 2 connected to the CPU 1. The shift register 12 is configured to allow parallel input of an address signal AD from the system bus 2. The shift register 13 receives a control signal W/R for specifying a read operation or a write operation from the first control block 14, and holds the control signal W/R therein.

The first control block 14 controls the input/output of parallel data to/from the shift registers 11, 12 and 13 and a serial data shift in accordance with the control signal W/R, an operation enable signal EN, a system clock CLK and other signals sent from the CPU 1 through the system bus 2. Further, the first control block 14 outputs an operation enable signal REN and a clock signal RCK to the backup area portion BU in accordance with the control signal W/R, the operation enable signal EN, the system clock CLK and other signals.

Referring to FIG. 1, the backup area portion BU includes shift registers (SR) 51, 52 and 53 which correspond to the shift registers 11, 12 and 13 in the power-off area portion PO respectively. The backup area portion BU also includes a selector (SEL) 54, a second control block 55 and a comparator (CMP) 62. The shift register 51 sends/receives 32-bit data to/from the power-off area portion PO, the shift register 52 sends/receives a 2-bit address to/from the power-off area portion PO, and the shift register 53 sends/receives a 1-bit control signal to/from the power-off area portion PO. The shift register 13 in the power-off area portion PO gives serial write data SWD transferred through a first signal line 25 to serial input ports of the shift registers 51, 52 and 53. Serial output ports of the shift registers 51, 52 and 53 are connected to an input port of the selector (SEL) 54. The output port of the shift register 53 is connected to the second control block 55.

The shift registers 51, 52 and 53 and the selector 54 are configured to perform serial data transfer to/from the power-off area portion PO in accordance with control signals output from the second control block 55. The second control block 55 receives the operation enable signal REN and the clock signal RCK from the first control block 14 in the power-off area portion PO and the control signal W/R supplied through the shift registers 13 and 53. The second control block 55 generates shift clocks C51, C52 and C53 for the shift registers 51, 52 and 53 in accordance with the operation enable signal REN, the clock signal RCK and the control signal W/R. The second control block 55 also outputs a selection signal S54 to the selector 54, a load signal L51 to the shift register 51 and other signals successively. Serial read data SRD selected and output from the selector 54 is sent to the shift register 11 in the power-off area portion PO through a second signal line 65.

Referring to FIG. 1, the backup area portion BU also includes four registers consisting of a clock register 56, a control register 57, a compare register 58 and a status register 59. The backup area portion BU further includes a selector (SEL) 60, a decoder (DEC) 61 and protection devices (PD). The four registers 56 to 59 can be specified from the power-off area portion PO by an address signal AD. The clock register 56 increments its value by one in accordance with a count signal CNT sent at intervals of one second, for instance. The control register 57 controls the start and stop of the operation of the clock register 56. The compare register 58 specifies such a predetermined value that an interrupt processing occurs when the clock register 56 reaches the predetermined value. Data held in the status register 59 indicates the operating status of the backup area portion BU.

Output ports of the registers 56 to 59 are connected to input ports of the selector 60. An output port of the selector 60 is connected to a parallel input port of the shift register 51. A parallel output port of the shift register 51 is connected to the input ports of the registers 56 to 59 in common. A parallel output port of the shift register 52 is connected to a selection terminal of the selector 60 and an input terminal of the decoder 61. When the decoder 61 receives an operation enable signal E61 from the second control block 55, the decoder 61 decodes an address AD output from the shift register 52 to control the write operation to the corresponding one of the registers 56 to 59.

The comparator 62 receives values of the clock register 56 and the compare register 58, and if these values are the same, the comparator 62 outputs an interrupt signal INT to the power-off area portion PO. Each of the first signal line 25, the second signal line 65 and other lines that connect the power-off area portion PO and the backup area portion BU have protection devices PD against electrostatic breakdown and latch-ups on the signal receiving side.

In the LSI circuit including the serial interface circuit as described above, when the CPU 1 reads the value of the clock register 56 in the backup area portion BU, the address assigned to the clock register 56 (e.g., binary "00") is specified as the address signal AD, the control signal W/R is set to a low level, and the operation enable signal EN is set to a high level.

Then, the write data WD, the address signal AD and the control signal W/R on the system bus are taken into the shift registers 11, 12 and 13 respectively, in accordance with a load signal L11 output from the first control block 14 in the power-off area portion PO. At the same time, the first control block 14 outputs the operation enable signal REN and the clock signal RCK to the second control block 55 in the backup area portion BU.

The signals taken into the shift registers 11, 12 and 13 are shifted successively in synchronization with the shift clock SCK supplied from the first control block 14, and transferred to the backup area portion BU as the 35-bit serial write data SWD.

In accordance with the operation enable signal REN and the clock signal RCK, the second control block 55 in the backup area portion BU puts the control signal W/R into the shift register 53 in synchronization with the shift clock C53 and puts the address signal AD into the shift register 52 in synchronization with the shift clock C52. At this time, the control signal W/R that has already put into the shift register 13 is sent to the decoder 61 as the operation enable signal E61. In this case, since the control signal W/R is low, the operation of the decoder 61 is disabled. Since the address signal AD is "00", the selector 60 selects the clock register 56 and performs parallel input of the count value of the clock register 56 to the shift register 51, in accordance with the load signal L51 output from the second control block 55. The second control block 55 outputs the selection signal S54 for selecting the shift register 51 to the selector 54 and the shift clock C51 to the shift register 51. Then, the value of the clock register 56 put in the shift register 51 is transferred to the power-off area portion PO as serial read data SRD.

When the value of the clock register 56 is shifted and input to the shift register 11 in the power-off area portion PO, serial data transfer between the power-off area portion PO and the backup area portion BU stops. Then, the CPU 1 can perform a parallel read of data held in the shift register 11 through the system bus 2. A similar technique is shown in the U.S. Pat. No. 6,260,086 publication.

With the serial interface circuit as described above, the CPU 1 must keep the operation enable signal EN high during the serial data transfer between the power-off area portion PO and the backup area portion BU, and must keep the control signal W/R low or high, depending on whether a read operation or a write operation is performed. Therefore, the CPU 1 cannot perform any other processing, and enters the standby state during the serial data transfer. The degrading of the throughput in the serial interface circuit due to a large CPU overhead is greater than that in the parallel interface circuit.

SUMMARY OF THE INVENTION

It is an object of the present invention to provide a serial interface circuit which can reduce a CPU overhead when a CPU accesses a peripheral circuit.

According to the present invention, a serial interface circuit for data transfer between a central processing unit disposed in a core portion of an integrated circuit and a peripheral register disposed in a peripheral circuit of the integrated circuit, includes a first circuit disposed in the core portion, the first circuit being connected to the central processing unit; and a second circuit disposed in the peripheral circuit, the second circuit being connected to the peripheral register and the first circuit. The first circuit includes a mirror register which corresponds to the peripheral register; a first shift register which holds an address signal specifying the peripheral register and an operation type signal specifying a read operation or a write operation to the peripheral register, the address signal and the operation type signal being supplied from the central processing unit, the first shift register, in the write operation, serially outputting write data to the second circuit in synchronization with a clock signal, the first shift register, in the read operation, serially receiving read data supplied from the second circuit in synchronization with the clock signal; and a first control block which generates the clock signal, and, in the read operation, generates a first timing signal for writing the read data held in the first shift register into the corresponding mirror register. The second circuit includes a second shift register which shifts and holds data supplied from the first circuit in synchronization with the clock signal and outputs data to be sent to the first circuit in synchronization with the clock signal serially to the first circuit; and a second control block which generates a second timing signal for either writing the write data held in the second shift register into the corresponding peripheral register or outputting data held in the peripheral register to the second shift register.

According to the present invention, the mirror register is connected to the CPU through a system bus, and holds the same data as the corresponding peripheral register. Therefore, the CPU can read and write data held in the peripheral register by performing parallel access to the mirror register through the system bus. This leads to a reduction of a CPU overhead when the CPU accesses the peripheral register.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
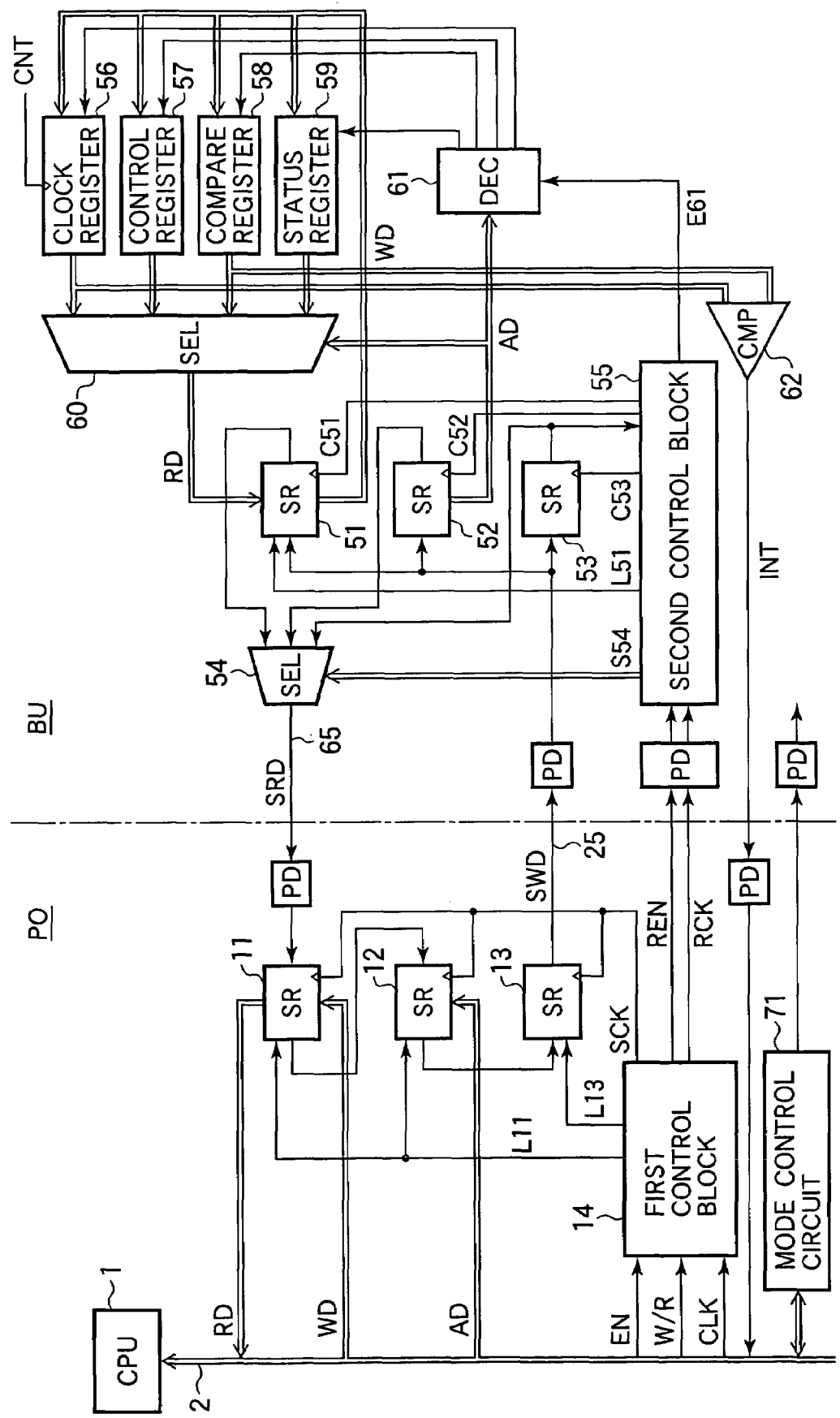
FIG. 1 is a diagram showing a configuration of a part of an LSI circuit including a conventional serial interface circuit.

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

In the present invention, when data held in a peripheral register 56 to 59 are updated while serial data transfer is not carried out on the first and second signal lines 25 and 65, an update notification circuit 63 reverses a signal level at the second signal line 65. When the signal level at the second signal line 65 is inverted while the serial data transfer is not carried out on the first and second signal lines 25 and 65, an update detection circuit 24 outputs an update detection signal DET. When the update detection signal DET is given to a first control block 15, the first control block issues a request to read the peripheral register 56 to 59, on behalf of the CPU 1. Accordingly, when data held in the peripheral register 56 to 59 are updated, data held in the mirror register 16 to 19 in the core portion are also updated. Therefore, the CPU 1 can read the latest data held in the peripheral register 56 to 59 at all times.

First Embodiment

Figure 2:
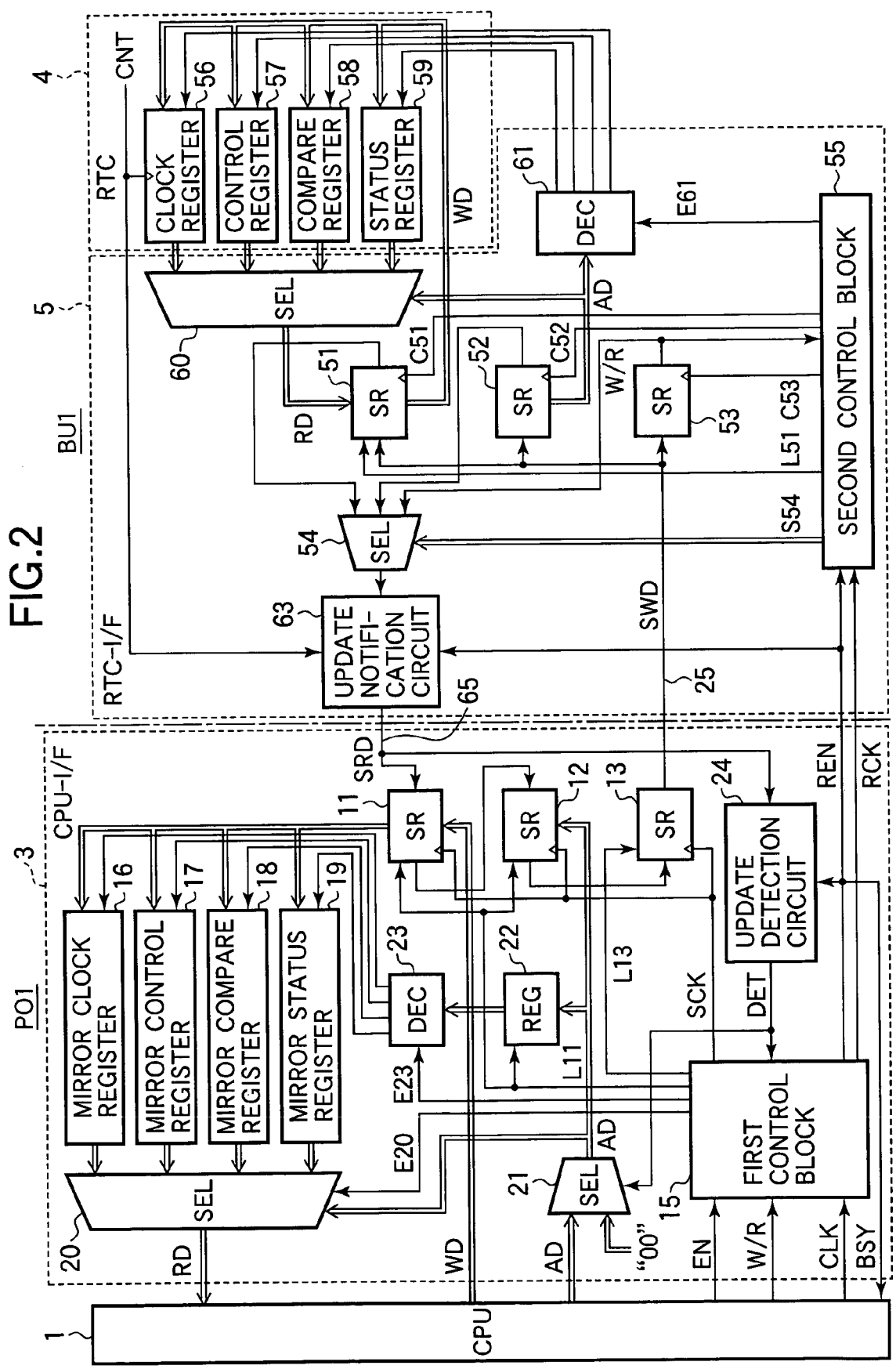
FIG. 2 is a diagram showing a configuration of a part of an LSI circuit including a serial interface circuit according to the first embodiment of the present invention.

FIG. 2 is a diagram showing a configuration of a part of an LSI circuit including a serial interface circuit according to the first embodiment of the present invention. The parts in FIG. 2 that are identical to or correspond to the parts in FIG. 1 are assigned identical reference characters.

Referring to FIG. 2, the LSI circuit includes a power-off area portion PO1 as a core portion of the LSI circuit and a backup area portion BU1 as a peripheral circuit of the LSI circuit. As shown in the left half of FIG. 1, the power-off area portion PO1 includes a CPU 1 and a CPU interface (CPU-I/F) 3. As shown in the right half of FIG. 1, the backup area portion BU1 includes a real time clock (RTC) portion 4 including an internal clock (not shown), and a real time clock interface (RTC-I/F) 5. Power is not supplied to the power-off area portion PO1 as the core portion of the LSI circuit in a standby state. On the other hand, power is supplied to the backup area portion BU1 as the peripheral circuit of the LSI circuit in a standby state. The CPU-I/F 3 and the RTC-I/F 5 form a serial interface circuit of the present invention.

Referring to FIG. 2, the CPU-I/F 3 in the power-off area portion PO1 includes a shift register (SR) 11 for performing serial transfer of 32-bit data, for instance, to/from the backup area portion BU1, a shift register (SR) 12 for performing serial transfer of a 2-bit address, for instance, specifying a peripheral register (56-59) in the backup area portion BU1, and a shift register 13 (SR) for transferring a 1-bit control signal specifying a read operation or a write operation to the backup area portion BU1. The CPU-I/F 3 in the power-off area portion PO1 also includes a first control block 15. The shift registers 11, 12 and 13 are connected in series and sends/receives a signal of 35 bits in total to/from the backup area portion BU1, in synchronization with a shift clock SCK supplied from the first control block 15 in the CPU-I/F 3.

The shift register 11 is configured to allow parallel input of write data WD and parallel output of read data RD from and to a system bus. The shift register 12 is configured to allow parallel input of an address signal AD. The shift register 13 is configured to hold a control signal W/R, which specifies a read operation or a write operation and is supplied from the first control block 15.

The first control block 15 controls parallel data input/output concerning the shift registers 11, 12 and 13 and a serial data shift, in accordance with the control signal W/R, an operation enable signal EN, a system clock CLK and other signals supplied through the system bus from the CPU 1. The first control block 15 also performs timing control in the power-off area portion PO1 and outputs an operation enable signal REN and a clock signal RCK to the backup area portion BU1.

The CPU-I/F 3 in the power-off area portion PO1 also includes mirror registers consisting of a mirror clock register 16, a mirror control register 17, a mirror compare register 18 and a mirror status register 18. The CPU-I/F 3 in the power-off area portion PO1 further includes a selector (SEL) 20. The mirror registers 16 to 19 in the power-off area portion PO1 correspond to peripheral registers consisting of a clock register 56, a control register 57, a compare register 58 and a status register 59 in the backup area portion BU1 respectively. Output ports of the mirror registers 16 to 19 are connected to input ports of the selector 20, and an output port of the selector 20 is connected to the system bus. The selector 20 outputs the read data RD to the system bus.

The CPU-I/F 3 in the power-off area portion PO1 further includes a selector 21 for selecting an address signal AD, a 2-bit register (REG) 22 and a decoder (DEC) 23. The selector 21 selects and outputs either the address signal AD sent from the system bus or a fixed address (e.g., binary "00") specifying the mirror clock register 16 and the clock register 56. The output port of the selector 21 is connected to a parallel input port of the shift register 12, a selection terminal of the selector 20 and an input port of the 2-bit register 22. An output port of the 2-bit register 22 is connected to the decoder 23.

When the decoder 23 receives an operation enable signal E23 from the first control block 15, the decoder 23 decodes the address signal AD output from the 2-bit register 22 and controls a write operation to the corresponding one of the mirror registers 16 to 19 on the basis of the address signal AD.

Moreover, the CPU-I/F 3 in the power-off area portion PO1 further includes an update detection circuit 24. In cooperation with an update notification circuit 63, which will be described later, in the backup area portion BU1, the update detection circuit 24 detects that the count value of the clock register 56 in the backup area portion BU1 is updated. If the count value of the clock register 56 is updated while the serial data transfer is not being performed, the update notification circuit 63 reverses the logic level of the serial read data SRD on the second signal line 65. When the logic level of the serial read data SRD on the second signal line 65 is inverted while the serial data transfer is not being performed (i.e., while the operation enable signal REN is low), the update detection circuit 24 outputs an update detection signal DET. The update detection signal DET is sent to the first control block 15 and a selection terminal of the selector 21.

The RTC-I/F 3 in the backup area portion BU1 includes shift registers 51, 52 and 53 corresponding to the shift registers 11, 12 and 13 in the power-off area portion PO1 respectively. The RTC-I/F 3 in the backup area portion BU1 also includes a selector (SEL) 54, a second control block 55 and the update notification circuit 63. The shift register 51 sends/receives 32-bit data to/from the power-off area portion PO1. The shift register 52 sends/receives a 2-bit address. The shift register 53 sends/receives a 1-bit control signal. The serial input ports of the shift registers 51, 52 and 53 receive serial write data SWD transferred from the shift register 13 in the power-off area portion PO1 through a first signal line 25. The serial output ports of the shift registers 51, 52 and 53 are connected to input ports of the selector 54. An output port of the shift register 53 is connected to the second control block 55.

The shift registers 51, 52 and 53 and the selector 54 are configured to perform serial data transfer to/from the power-off area portion PO1 in accordance with a control signal from the second control block 55. The second control block 55 supplies shift clocks C51, C52 and C53 to the shift registers 51, 52 and 53 in a certain sequence and sequentially outputs a selection signal S54 to the selector 54, in accordance with the operation enable signal REN and the clock signal RCK sent from the first control block 15 in the power-off area portion PO1. The serial read data SRD output from the selector 54 is sent through the update notification circuit 63 and the second signal line 65 to the shift register 11 in the power-off area portion PO1. If a count signal CNT is supplied while the operation enable signal REN is low, the update notification circuit 63 inverts the logic level of the serial read data SRD output from the selector 54. If the count signal CNT is given to the update notification circuit 63 while the operation enable signal REN is high, the update notification circuit 63 stores the status, and inverts the logic level of the serial read data SRD after the operation enable signal REN goes low again.

The RTC portion 4 in the backup area portion BU1 includes a clock register 56, a control register 57, a compare register 58 and a status register 59 that can be specified by the address signal AD from the power-off area portion PO1. The clock register 56 increments its value by one in accordance with the count signal CNT supplied at intervals of one second from an oscillator (not shown) which operates at all times, even in the backup state. The control register 57 controls the start and stop of the operation of the clock register 56. The compare register 58 stores such a value that an interrupt processing occurs when the clock register 56 reaches the predetermined value. The status register 59 indicates the operating status of the backup area portion BU1 or other status.

The RTC-I/F 5 in the backup area portion BU1 further includes a selector (SEL) 60 and a decoder (DEC) 61. Outputs of the registers 56 to 59 are connected to input ports of the selector 60, and an output port of the selector 60 is connected to a parallel input port of the shift register 51. A parallel output port of the shift register 51 is connected to input ports of the registers 56 to 59 in common. A parallel output port of the shift register 52 holding the address signal AD is connected to a selection terminal of the selector 60 and an input terminal of the decoder 61. A control terminal of the decoder 61 receives an operation enable signal E61 from the second control block 55. When the operation enable signal E61 is given to the decoder 61, the decoder 61 decodes an address output from the shift register 52 and controls a write operation to the corresponding one of the registers 56 to 59.

Although, in a similar way to a case of FIG. 1, each of the first signal line 25, the second signal line 65 and other lines connecting the power-off area portion PO1 and the backup area portion BU1 has a protection device (PD) against electrostatic breakdown and latch-ups on the signal receiving side, protection devices are not shown in FIG. 2.

Figure 3:
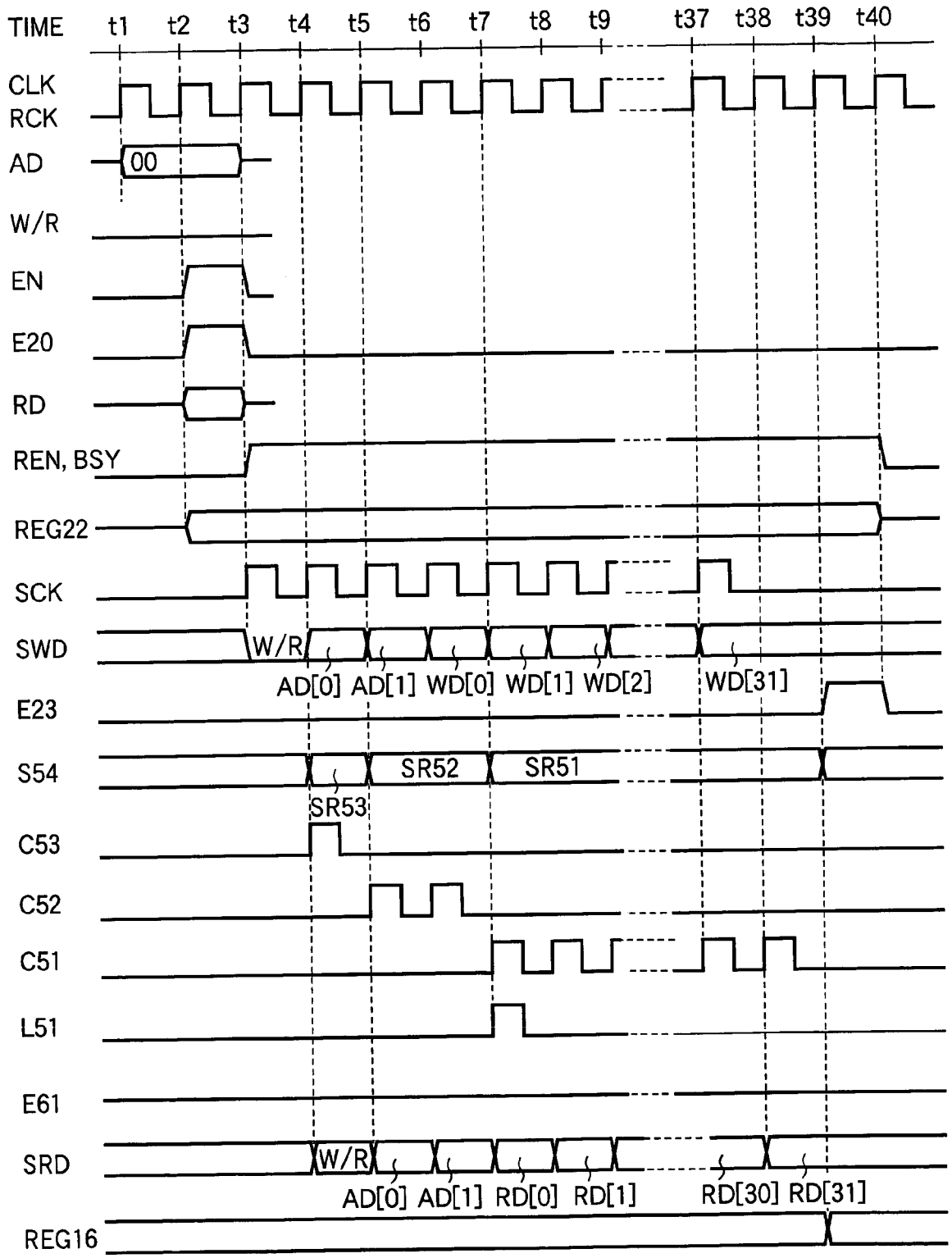
FIG. 3 is a timing chart showing a read operation when the CPU reads a clock register in a backup area portion.

The read operation will be described below. FIG. 3 is a timing chart showing the read operation when the CPU 1 in the power-off area portion PO1 read the clock register 56 in the backup area portion BU1.

The CPU 1 outputs the address signal AD specifying an address "00" of the clock register 56 and holds the control signal W/R low at time t1. When the system clock CLK rises at time t2, the operation enable signal EN goes high. Since the update detection signal DET is low, the selector 21 selects and gives the address signal AD to the shift register 12, the selector 20 and the register 22. The operation enable signal E20 is output from the first control block 15 to the selector 20, and data held in the mirror clock register 16 selected by the selector 20 are output to the data bus as read data RD. The CPU 1 reads data held in the mirror clock register 16 to output to the system bus.

At the same time, the first control block 15 outputs the load signal L11 to the shift registers 11 and 12 and the register 22. The write data WD on the data bus is loaded into the shift register 11, and the address signal AD is loaded into the shift register 12 and the register 22. A load signal L13 brings the control register W/R low in the shift register 13.

At the rising edge of the system clock CLK at time t3, the operation enable signal EN goes low, and the read operation by the CPU 1 ends. Then, the CPU 1 can handle processing except for access to the backup area portion BU1. At time t3, the operation enable signal REN output from the first control block 15 goes high. The operation enable signal REN is sent to the second control block 55 in the backup area portion BU1 and is also output to the system bus as a busy signal BSY. The output of the busy signal BSY disables access from the CPU 1 to the backup area portion BU1. The high operation enable signal REN allows the second control block 55 to operate, and the shift register 53 is selected by the selector 54 in accordance with the selection signal S54.

After the system clock CLK rises at time t3, the first control block 15 gives the shift clock SCK synchronous to the system clock CLK to the shift registers 11, 12 and 13. The first control block 15 also gives the clock signal RCK to the second control block 55 at the similar timing.

Then, the control signal W/R, the address signal AD and the write data WD loaded into the shift registers 13, 12 and 11 are successively transferred from the shift register 13 to the shift registers 51, 52 and 53 in the backup area portion BU1 as serial write data SWD in that order, in synchronization with the shift clock SCK.

When the clock signal RCK rises at time t4, the shift clock C53 is output from second control block 55 to the shift register 53. The output causes the control signal W/R (low) output as serial write data SWD to be held in the shift register 53 and output from the shift register 53 to the second control block 55. Then, the second control block 55 can recognize the read request from the CPU 1.

The data held in the shift register 53 beforehand are transferred to the power-off area portion PO1 as the serial read signal SRD through the selector 54 and the update notification circuit 63. Then, the second control block 55 selects the shift register 52 in accordance with the selection signal S54 to the selector 54.

When the clock signal RCK rises at time t5 or t6, the address signal AD output as serial write data SWD is held in the shift register 52 in synchronization with the shift clock C52 output from the second control block 55. The data held in the shift register 52 before are transferred to the power-off area portion PO1 as the serial read signal SRD. The new address signal AD held in the shift register 52 is sent to the selector 60 and the decoder 61. Then, the selector 60 selects and outputs the count value of the clock register 56 to the shift register 51 as read data RD.

When the clock signal RCK rises at time t7, the load signal L51 output from the second control block 55 causes the count value of the clock register 56 selected by the selector 60 to be written in parallel in the shift register 51. Then, the second control block 55 selects the shift register 51 in accordance with the selection signal S54 to the selector 54.

When the clock signal RCK rises at time t7 to t38, the write data WD output as the serial write data SWD is successively held in the shift register 51. The data held in the shift register 51 before is transferred successively to the power-off area portion PO1 as the serial read signal SRD. Then, data held in the shift registers 11, 12 and 13 in the power-off area portion PO1 and data held in the shift registers 51, 52 and 53 in the backup area portion BU1 are completely interchanged. The write data WD transferred from the power-off area portion PO1 is ignored on the backup area portion BU1.

The first control block 15 in the power-off area portion PO1 gives the operation enable signal E23 to the decoder 23 at time t39. This causes a load signal to be output to the mirror register (the mirror clock register 16, in this example) corresponding to the address signal AD decoded by the decoder 23, and the count value of the clock register 56 held in the shift register 11 is written into the mirror clock register 16.

When the series of operation ends at time t40, the operation enable signal REN and the busy signal BSY go low.

Figure 4:
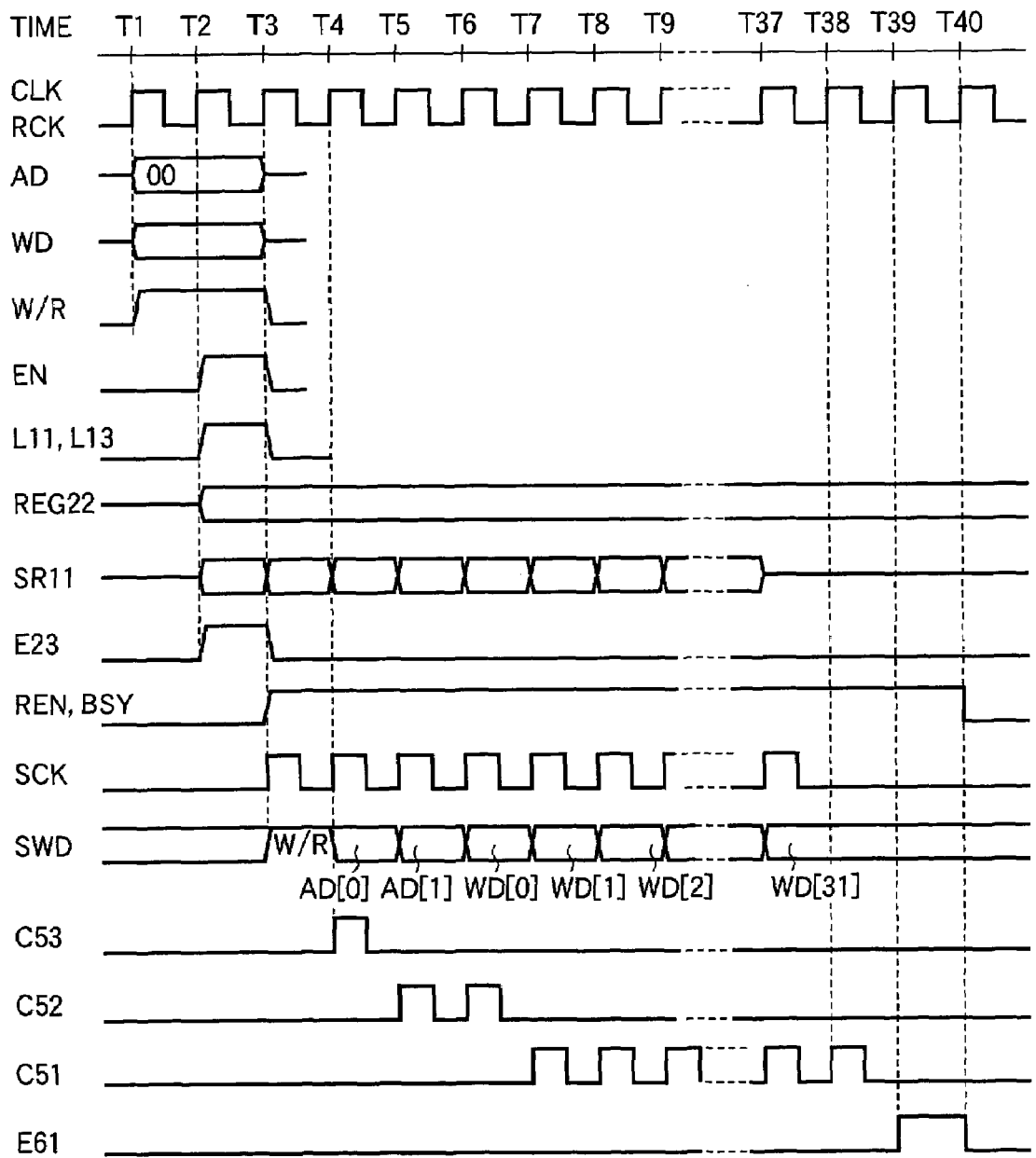
FIG. 4 is a timing chart showing a write operation when the CPU writes a clock register in a backup area portion.

Next, the write operation will be described. FIG. 4 is a timing chart showing the write operation when the CPU 1 writes the clock register 56 in the backup area portion BU1.

The CPU 1 outputs an address signal AD specifying the address "00" of the clock register 56 and a write data WD to be written in the clock register 56 at time T1, and the control signal W/R is set to a high level. When the system clock CLK rises at time T2, the operation enable signal EN goes high. Since the update detection signal DET is low, the selector 21 selects and outputs the address signal AD to the shift register 12, the selector 20 and the register 22.

At the same time, the first control block 15 outputs the load signal L11 to the shift registers 11 and 12 and the register 22. The write data WD on the data bus is loaded into the shift register 11, and the address signal AD is loaded into the shift register 12 and the register 22. The load signal L13 brings the control signal W/R high in the shift register 13. The first control block 15 outputs the operation enable signal E23 to the decoder 23, and the write data WD loaded into the shift register 11 is written to the mirror register (the mirror clock register 16 in the shown example) corresponding to the address signal AD decoded by the decoder 23.

When the system clock CLK rises at time T3, the operation enable signal EN goes low, and the read operation by the CPU 1 ends. Then, the CPU 1 can handle processing other than access to the backup area portion BU1. The operation enable signal REN output from the first control block 15 goes high at time T3. The operation enable signal REN is supplied to the second control block 55 in the backup area portion BU1 and is also output to the system bus as the busy signal BSY. The operation enable signal REN set to a high level enables the second control block 55.

After the system clock CLK rises at time T3, the first control block 15 gives the shift clock SCK, synchronous to the system clock CLK, to the shift registers 11, 12 and 13. The first control block 15 also gives the clock signal RCK to the second control block 55 at the similar timing. Then, the control signal W/R, the address signal AD and the write data WD loaded into the shift registers 13, 12 and 11 are successively transferred from the shift register 13 to the shift registers 51, 52 and 53 in the backup area portion BU1 as serial write data SWD successively in that order, in synchronization with the shift clock SCK.

When the clock signal RCK rises at time T4, the second control block 55 outputs the shift clock C53 to the shift register 53. This causes the control signal W/R (high) output as serial write data SWD to be held in the shift register 53 and output from the shift register 53 to the second control block 55. Then, the second control block 55 can recognize the write request from the CPU 1.

When the clock signal RCK rises at time T5 or T6, the address signal AD output as serial write data SWD is held in the shift register 52 in synchronization with the shift clock C52 from the second control block 55. The address signal AD held in the shift register 52 is supplied to the selector 60 as a selection signal. Accordingly, the selector 60 selects and outputs the count value of the clock register 56 to the shift register 51 in parallel as read data RD. The second control block 55 does not output the load signal L51, and data held in the shift register 51 do not change.

When the clock signal RCK rises at time T7 to T38, the write data WD output as serial write data SWD is successively shifted and held in the shift register 51. Then, data held in the shift registers 11, 12 and 13 in the power-off area portion PO1 and data held in the shift registers 51, 52 and 53 in the backup area portion BU1 are completely interchanged.

The second control block 55 gives the operation enable signal E61 to the decoder 61 at time T39. This outputs a load signal to the clock register 56 corresponding to the address signal AD decoded by the decoder 61, and the write data WD held in the shift register 51 is written into the clock register 56.

When the series of operation ends at time T40, the operation enable signal REN and the busy signal BSY go low.

Next, the automatic update operation of the mirror register will be described. When the count value of the clock register 56 in the backup area portion BU1 changes (increments), an automatic update operation adjusts data held in the mirror clock register 16 in the power-off area portion PO1 to data held in the clock register 56, without any intervention by the CPU 1.

When the count signal CNT rises in the backup area portion BU1, the clock register 56 increments, and the update notification circuit 63 also detects the rise of the count signal CNT. The update notification circuit 63 checks the operation enable signal REN to determine whether or not data transfer is in progress. If the operation enable signal REN is low, that is, if data transfer is not carried out, the update notification circuit 63 inverts the logic level of the signal output from the selector 54 and outputs it to the second signal line 65 as a serial read signal SRD. If the operation enable signal REN is high, that is, if data transfer is in progress, just the rise of the count signal CNT is stored, and the serial read signal SRD is not inverted. After the data transfer operation ends, the serial read signal SRD is inverted to indicate that an update has occurred.

While the operation enable signal REN is low, the update detection circuit 24 in the power-off area portion PO1 monitors the logic level of the serial read signal SRD on the second signal line 65. When the logic level of the serial read signal SRD is inverted, the update detection circuit 24 outputs the update detection signal DET. The update detection signal DET is sent to the first control block 15 and the selector 21.

Then, the selector 21 selects the fixed address "00" corresponding to the address of the clock register 56 and gives the fixed address "00" to the shift register 12 and the register 22. The first control block 15 starts a read operation when the update detection signal DET is given. The read operation is performed without any intervention by the CPU 1, and the read data RD is not output from the selector 20 to the system bus.

The other part of the operation is the same as that in the read operation described above. The count value is read from the clock register 56 in the backup area portion BU1 specified by the address signal AD ("00" in the shown example) and written into the mirror clock register 16 in the power-off area portion PO1. This way, data held in the mirror clock register 16 and the clock register 56 are updated to agree with each other without any intervention by the CPU 1.

If the CPU 1 issues an instruction of a read operation or a write operation while the automatic update operation of the mirror register is in progress, the first control block 15 stops the automatic update operation and starts an operation in accordance with the instructions from the CPU 1.

Next, the operation when the standby state is cleared will be described. In the standby state, power supply to the power-off area portion PO1 is shut off, and the system clock CLK stops. This erases data held in the mirror registers 16 to 19 in the power-off area portion PO1. When the standby state is cleared to restart power supply to the power-off area portion PO1, data held in the mirror registers 16 to 19 are not restored and become undefined. Accordingly, the CPU 1 must carry out a read operation for the registers 16 to 19 after the standby state is cleared. Then, data held in the mirror registers 16 to 19 in the power-off area portion PO1 agree with data held in the corresponding peripheral registers 56 to 59 in the backup area portion BU1.

The serial interface circuit according to the first embodiment has the following advantages.

(a) The mirror registers 16 to 19 corresponding to the peripheral registers 56 to 59 in the backup area portion BU1 are disposed in the power-off area portion PO1. When the CPU 1 reads data held in the peripheral registers 56 to 59, data held in the mirror registers 16 to 19 are read in parallel through the system bus. Accordingly, the CPU 1 can finish the read operation before the operation to read the peripheral registers 56 to 59 ends. Therefore, the CPU overhead can be reduced.

(b) When the CPU 1 writes the peripheral registers 56 to 59, the data is written in parallel in the mirror registers 16 to 19. The CPU 1 can finish the write operation before the operation to write the peripheral registers 56 to 59 ends. Accordingly, the CPU overhead can be reduced.

(c) Since the busy signal BSY indicates that serial data communication is in progress, access from the CPU 1 can be avoided during the serial data transfer.

(d) When the automatic update function of the clock register increments the clock register 56 in the backup area portion BU1, the mirror register (the mirror clock register 16) in the power-off area portion PO1 is updated automatically and immediately. Therefore, the CPU overhead can be reduced.

(e) The update notification circuit 63 inverting the logic level of the second signal line 65 for serial data transfer and the update detection circuit 24 detecting the inversion of the logic level of the second signal line 65 are provided in the serial data interface of the present invention as means for indicating the increment of the clock register 56. This eliminates the need for adding a signal line for reporting the increment.

(f) If the clock register 56 increments during serial data transfer, the update notification circuit 63 suspends an automatic update request and outputs an update notification after the serial data transfer ends. Accordingly, the clock register 56 in the backup area portion BU1 and the mirror clock register 16 in the power-off area portion PO1 at all times agree with each other.

The present invention is not limited to the first embodiment described above, and a variety of modifications can be made. For instance, the present invention can be applied not only to the serial data transfer between the power-off area portion PO1 and the backup area portion BU1 but also to the serial data transfer between a core portion including a CPU and a peripheral circuit; and the number of the registers and the number of the data bits transferred serially are not limited to the numbers indicated above.

Second Embodiment

Figure 5:
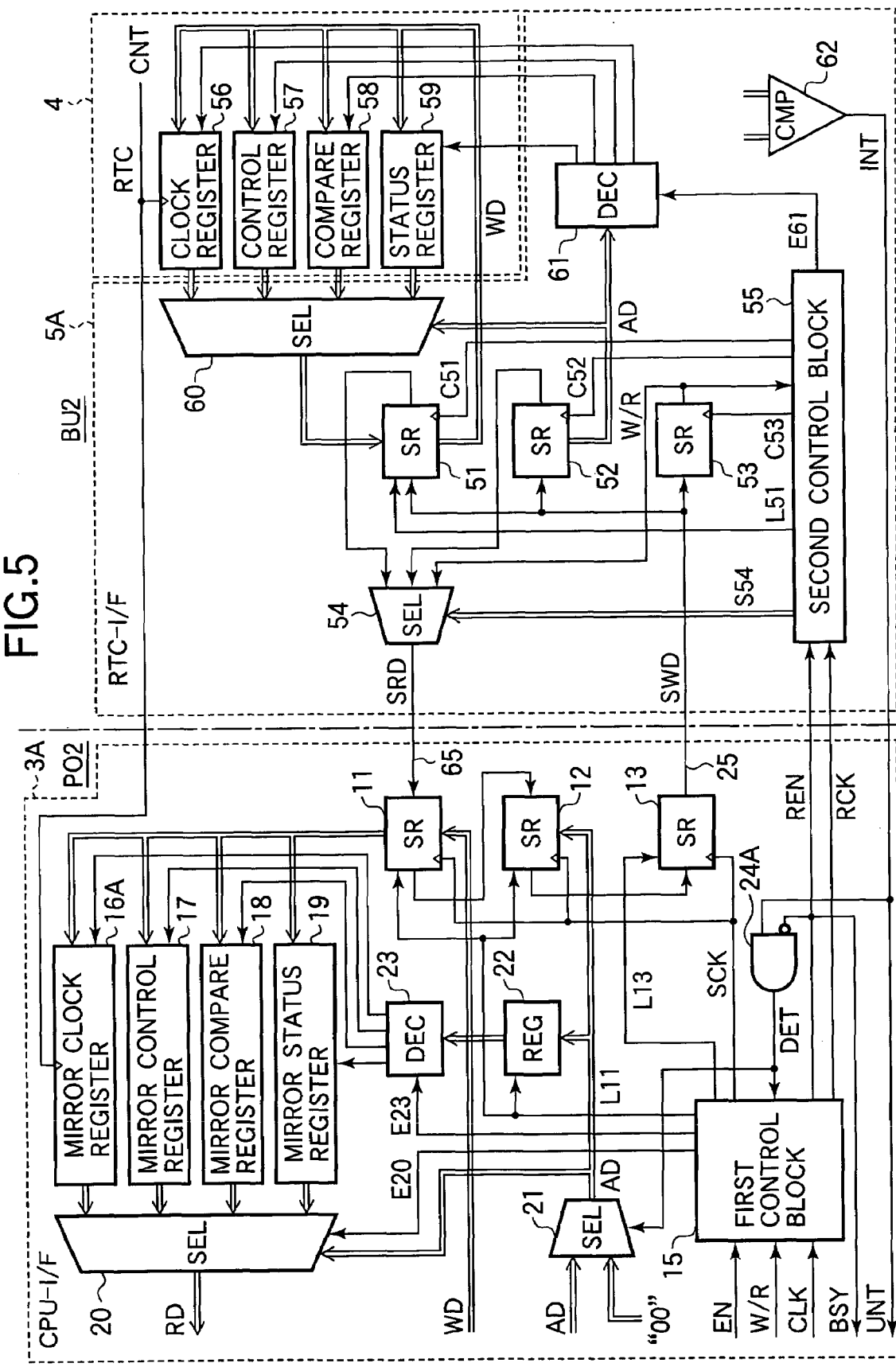
FIG. 5 is a diagram showing a configuration of a part of an LSI circuit including a serial interface circuit according to the second embodiment of the present invention.

FIG. 5 is a diagram showing a configuration of a part of an LSI circuit including a serial interface circuit according to the second embodiment of the present invention. The parts in FIG. 5 that are identical to or correspond to the parts in FIG. 2 are assigned the identical reference characters.

Referring to FIG. 5, the serial interface circuit according to the second embodiment includes a mirror clock register 16A which increments in accordance with a count signal CNT in the same way as the clock register 56 in the backup area portion BU2, instead of the mirror clock register 16 in the power-off area portion PO1 shown in FIG. 2. The serial interface circuit according to the second embodiment also includes a logic gate 24A instead of the update detection circuit 24 in the power-off area portion PO1 shown in FIG. 2. The logic gate 24A outputs an update detection signal DET when an interrupt signal INT is sent from the backup area portion BU2 while an operation enable signal REN is held low. The serial interface circuit according to the second embodiment does not have an update notification circuit 63 in the backup area portion BU1 shown in FIG. 2 and outputs an output signal of a selector 54 through a second signal line 65 to the shift register 11 as serial read signal SRD. The other elements in FIG. 5 are the same as those in FIG. 2.

When a clock register 56 in the backup area portion BU2 increments in accordance with the count signal CNT, the mirror clock register 16A in the power-off area portion PO2 also increments in accordance with the same count signal CNT. Accordingly, the clock registers 56 and the mirror clock registers 16A hold the same count value at all times.

If an interrupt signal INT is output from the backup area portion BU2 while serial data transfer is not being carried out, a detection signal is sent to the first control block 15 in the power-off area portion PO2. The first control block 15 performs an automatic update operation of the mirror register, as in the first embodiment described above. The CPU reads and writes the registers in the backup area portion BU2 as in the first embodiment described above.

The serial interface circuit according to the second embodiment has the following advantages, in addition to the advantages (a) to (c) described above.

(g) The clock register 56 in the backup area portion BU2 and the mirror clock register 16A in the power-off area portion PO2 hold the same count value at all times. Accordingly, the CPU can read the latest count value of the clock register 56.

(h) The mirror clock register 16A is automatically updated in accordance with the interrupt signal INT. If data held in the clock register 56 in the backup area portion BU2 and the mirror clock register 16A in the power-off area portion PO2 do not match because of noise or the like, the value of the mirror clock register 16A in the power-off area portion PO2 can be automatically corrected when an interrupt source occurs, e.g., when the value of the clock register 56 agrees with the value of the compare register 58.

Third Embodiment

Figure 6:
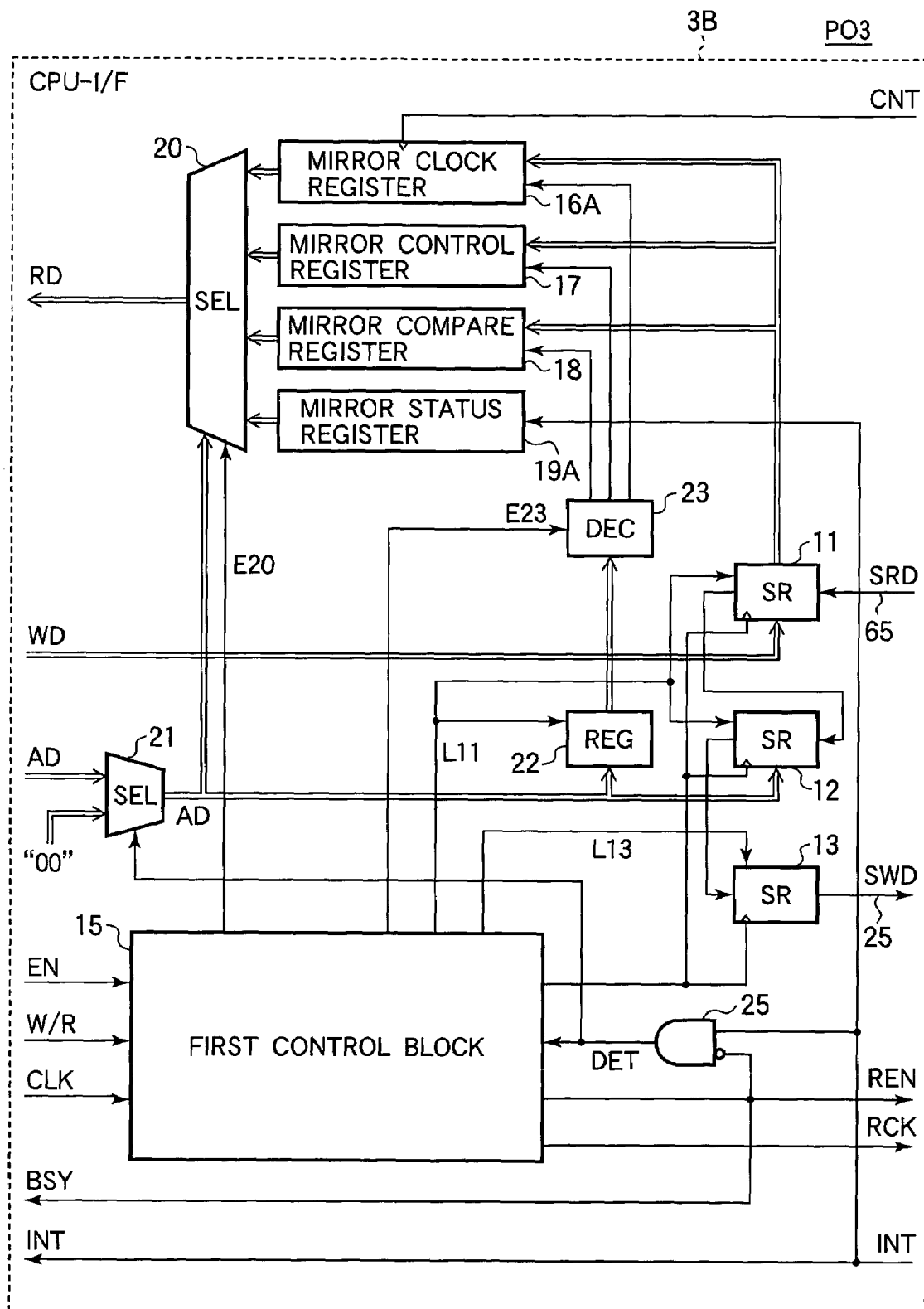
FIG. 6 is a diagram showing a configuration of a part of a serial interface circuit according to the third embodiment of the present invention.

FIG. 6 is a diagram showing a configuration of a part of a serial interface circuit according to the third embodiment of the present invention. The parts in FIG. 6 that are identical to or correspond to the parts in FIG. 5 are assigned the identical reference characters. In FIG. 6, just the power-off area portion PO3 of the serial interface circuit according to the third embodiment is shown. The backup area portion BU3 of the serial interface circuit according to the third embodiment is the same as that according to the second embodiment shown in FIG. 5.

Referring to FIG. 6, the serial interface circuit according to the third embodiment includes a mirror status register 19A instead of the mirror status register 19 shown in FIG. 5, and data held in the mirror status register 19A can be set by an interrupt signal INT. The other elements in FIG. 6 are the same as those in FIG. 5.

If the interrupt signal INT is generated in the backup area portion BU3 of the serial interface circuit according to the third embodiment, the CPU can recognize the status of the backup area portion BU3 immediately by reading the mirror status register 19A.

Fourth Embodiment

Figure 7:
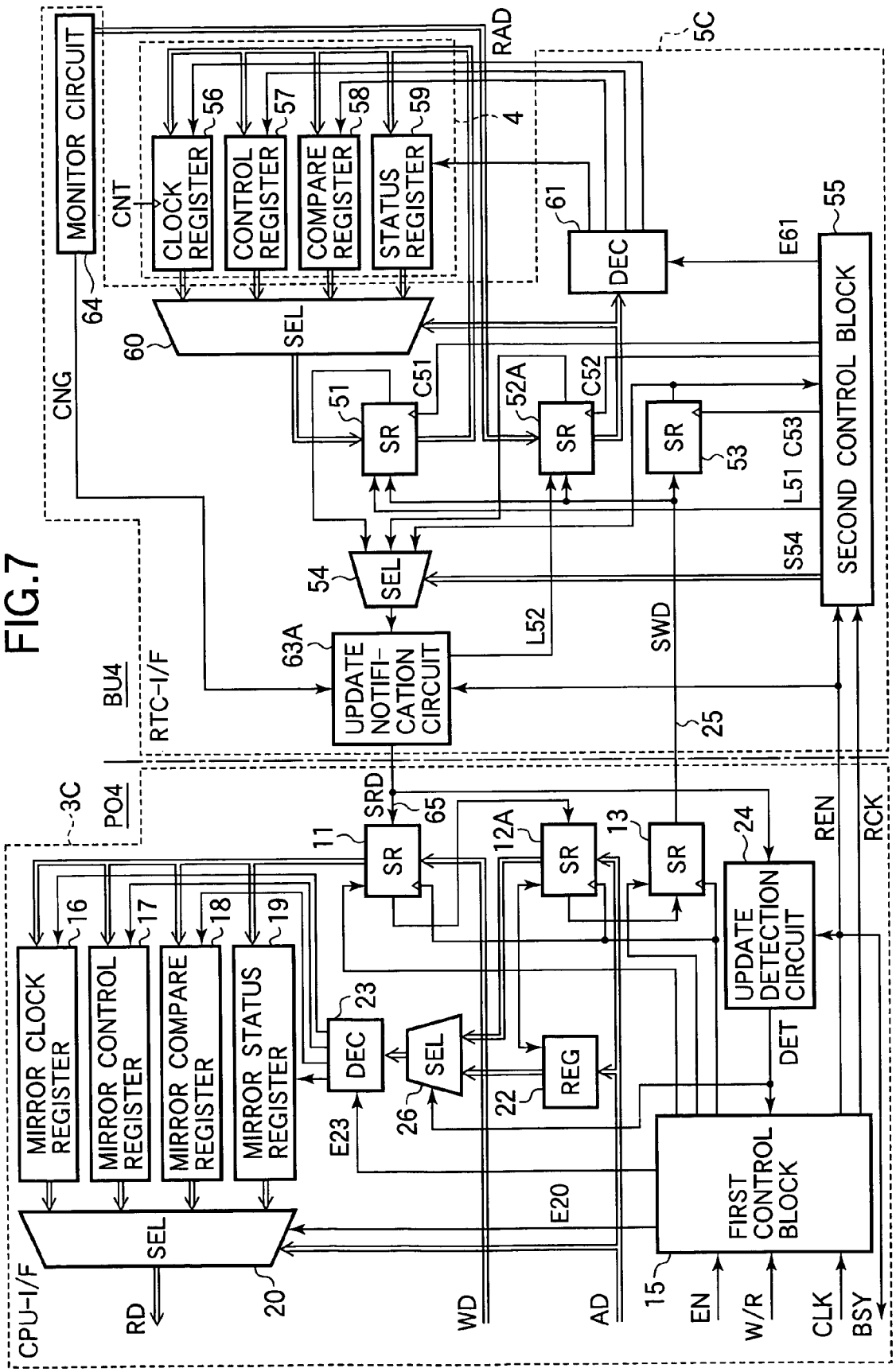
FIG. 7 is a diagram showing a configuration of a part of an LSI circuit including a serial interface circuit according to the fourth embodiment of the present invention.

FIG. 7 is a diagram showing a configuration of a part of an LSI circuit including a serial interface circuit according to the fourth embodiment of the present invention. The parts in FIG. 7 that are identical to or correspond to the parts in FIG. 2 are assigned the identical reference characters.

The serial interface circuit according to the fourth embodiment includes a selector 26 in the power-off area portion PO4 shown in FIG. 7 instead of the selector 21 shown in FIG. 2. The serial interface circuit according to the fourth embodiment also includes a shift register (SR) 12A in the power-off area portion PO4 shown in FIG. 7 instead of the shift register 12 shown in FIG. 2. The shift register 12A shown in FIG. 7 is a little different from the shift register 12 shown in FIG. 2 in function. The shift register 12A allows parallel input of an address signal AD supplied from the system bus and parallel output of the address signal AD held there. The selector 26 selects the address signal held in the register 22 and the address signal output in parallel from the shift register 12A in accordance with a detection signal DET supplied from an update detection circuit 24 and gives the address signals to a decoder 23. Since the selector 21 shown in FIG. 2 is eliminated in the fourth embodiment, the address signal AD of the system bus is supplied directly to the shift register 12A, the selector 20 and the register 22.

In the backup area portion BU4, a shift register 52A and an update notification circuit 63A shown in FIG. 7 are disposed instead of the shift register 52 and the update notification circuit 63 shown in FIG. 2, although their functions are different a little. The shift register 52A can receive parallel input of an address signal RAD in accordance with a load signal L52. When a monitor circuit 64 detects a change in data held in the peripheral registers 56 to 59, the address signal RAD is output together with a change detection signal CNG and indicates the address of the changed register. When the change detection signal CNG is given while an operation enable signal REN is low, the update notification circuit 63A inverts the logic level of serial read data SRD output from a selector 54 and outputs it together with the load signal L52 for the shift register 52A. The other elements in FIG. 7 are the same as those in FIG. 2.

If the monitor circuit 64 in the backup area portion BU4 of the serial interface circuit detects a change of data held in the peripheral registers 56 to 59, the monitor circuit 64 outputs the change detection signal CNG and the address signal RAD. If the output occurs while the operation enable signal REN is low, the update notification circuit 63A inverts the level of the serial read signal SRD on a second signal line 65 and outputs a load signal L52 to the shift register 52A. Then, the address signal RAD output from the monitor circuit 64 is written in parallel in the shift register 52A.

When the update detection circuit 24 in the power-off area portion PO4 detects the inversion of the serial read signal SRD, an automatic update operation starts as in the first embodiment, and a register read request signal is output to the backup area portion. In response to the signal, the register specified by the address signal RAD held in the shift register 52A (that is, the changed register) is read and written in parallel in the shift register 51 in the backup area portion BU4. The data written in the shift registers 52A and 51 are transferred successively through the selector 54 and the update notification circuit 63A to the power-off area portion PO4 as the serial read signal SRD.

Then, the shift register 12A in the power-off area portion PO4 holds the changed address of the register in the backup area portion BU4, and the shift register 11 holds the data of the register after the change. The selector 26 selects the output signal of the shift register 12A in accordance with the detection signal DET and outputs it to the decoder 23. When the first control block 15 gives an operation enable signal E23 to the decoder 23, data held in the shift register 11 are written in the mirror register corresponding to the changed register in the backup area portion BU4. The data held in the mirror register are automatically updated this way. The CPU reads and writes the registers in the backup area portion BU4 in the same way as in the first embodiment.

The serial interface circuit of the fourth embodiment has the following advantage, in addition to (a) and (c) described earlier.

(i) The address of a register updated in the backup area portion BU4 is transferred to the power-off area portion PO4. When any register is updated, the corresponding mirror register in the power-off area portion PO4 is updated to the latest data. Accordingly, the CPU can read the latest data of the peripheral registers 56 to 59 in the backup area portion BU4 besides the mirror clock register 16.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A serial interface circuit for data transfer between a central processing unit disposed in a core portion of an integrated circuit and a peripheral register disposed in a peripheral circuit of the integrated circuit, the serial interface circuit comprising:
a first circuit disposed in the core portion, the first circuit being connected to the central processing unit; and
a second circuit disposed in the peripheral circuit, the second circuit being connected to the peripheral register and the first circuit;
the first circuit including:

a mirror register which corresponds to the peripheral register;

a first shift register which holds an address signal specifying the peripheral register and an operation type signal specifying a read operation or a write operation to the peripheral register, the address signal and the operation type signal being supplied from the central processing unit, the first shift register, in the write operation, serially outputting write data to the second circuit in synchronization with a clock signal, the first shift register, in the read operation, serially receiving read data supplied from the second circuit in synchronization with the clock signal; and a first control block which generates the clock signal, and, in the read operation, generates a first timing signal for writing the read data held in the first shift register into the corresponding mirror register;

the second circuit including:

a second shift register which shifts and holds data supplied from the first circuit in synchronization with the clock signal and outputs data to be sent to the first circuit in synchronization with the clock signal serially to the first circuit; and a second control block which generates a second timing signal for either writing the write data held in the second shift register into the corresponding peripheral register or outputting data held in the peripheral register to the second shift register.

2. The serial interface circuit according to claim 1, further comprising:

a first signal line used for data transfer from the second circuit to the first circuit; and a second signal line used for data transfer from the first circuit to the second circuit.

3. The serial interface circuit according to claim 2, wherein the second circuit further includes an update notification circuit which outputs an update notification signal to the second signal line if data held in the peripheral register is updated while data is not being transferred serially on the first and second signal lines;

wherein the first circuit further includes an update detection circuit which outputs an update detection signal to the first control block when receiving the update notification signal through the second signal line from the update notification circuit, the first control block issuing a read request to the peripheral register when receiving the update detection signal from the update detection circuit.

4. The serial interface circuit according to claim 1, wherein an update of data held in the peripheral register causes the mirror register to be updated.

5. The serial interface circuit according to claim 3, wherein the second circuit further includes a monitor circuit which outputs an address of the peripheral register to the first control block through the update notification circuit when data held in the peripheral register is updated.

* * * * *